United States Patent [19]

Burnett

[11] 4,094,501
[45] June 13, 1978

[54] ILLUSION APPARATUS

[76] Inventor: Edward D. Burnett, 3945-A W. Ainslie, Chicago, Ill. 60625

[21] Appl. No.: 750,282

[22] Filed: Dec. 13, 1976

[51] Int. Cl.² .............................................. A63J 5/02
[52] U.S. Cl. .................................... 272/8 M; 350/235
[58] Field of Search ............. 40/326; 119/5; 272/8 R, 272/8 D, 8 M, 8.5, 9, 10, 11, 13, 21, 22, 25, 26; 350/179, 180, 235, 237, 238; 352/48, 49, 88

[56] References Cited

U.S. PATENT DOCUMENTS

| 295,218 | 3/1884 | Zanetti | 119/5 |
| 389,198 | 9/1888 | Castan | 272/13 |
| 1,378,011 | 5/1921 | Creiger | 350/179 UX |
| 1,760,842 | 5/1930 | Greenwood | 272/9 |
| 2,232,110 | 2/1941 | Gruenhut | 272/8.5 |
| 3,655,272 | 4/1972 | Valadez | 272/13 UX |

Primary Examiner—Harland S. Skogquist

[57] ABSTRACT

An apparatus for achieving an optical illusion, which consists of an image of a person or object appearing in a liquid container, with the apparatus consisting of a horizontally extending chamber having an angularly disposed mirror for reflecting the image of the person or object within the chamber through a series of liquid containers, with one container being placed in the line of sight of a viewer of the apparatus.

1 Claim, 3 Drawing Figures

U.S. Patent   June 13, 1978   4,094,501
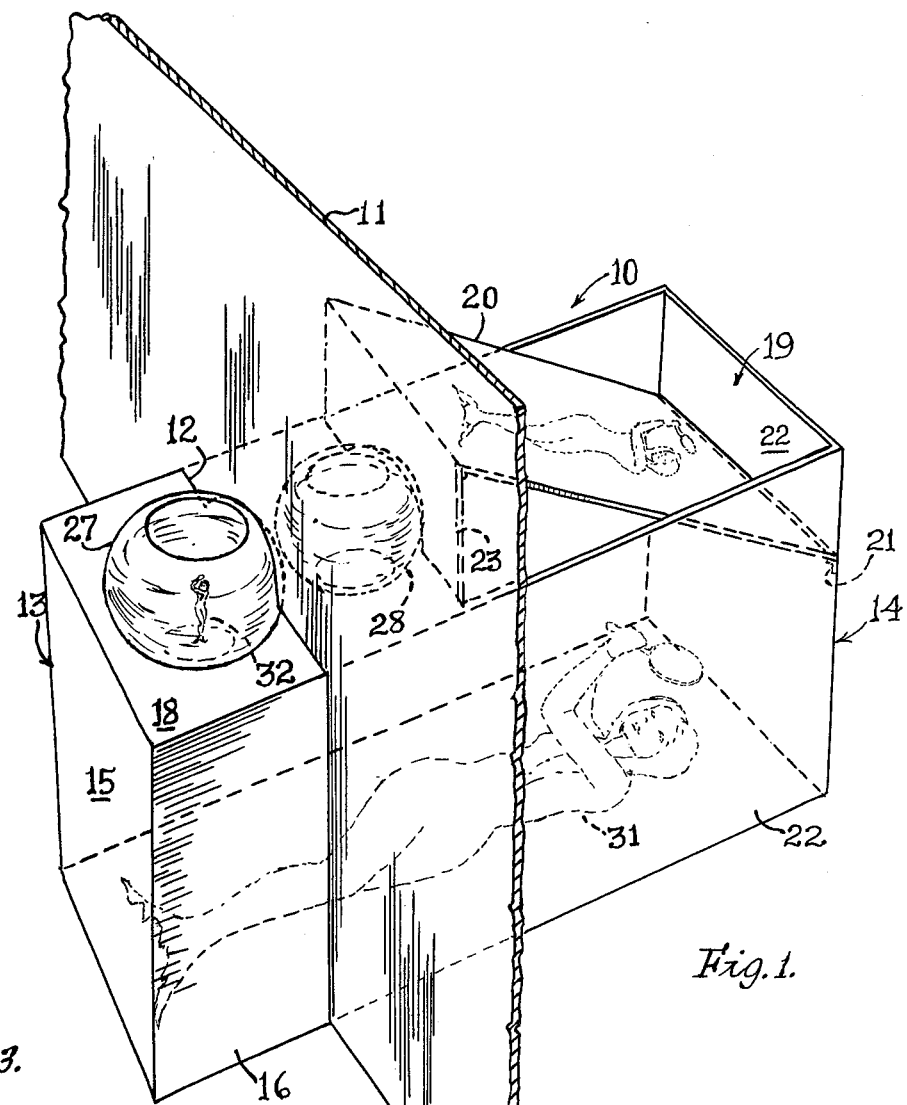
Fig.1.
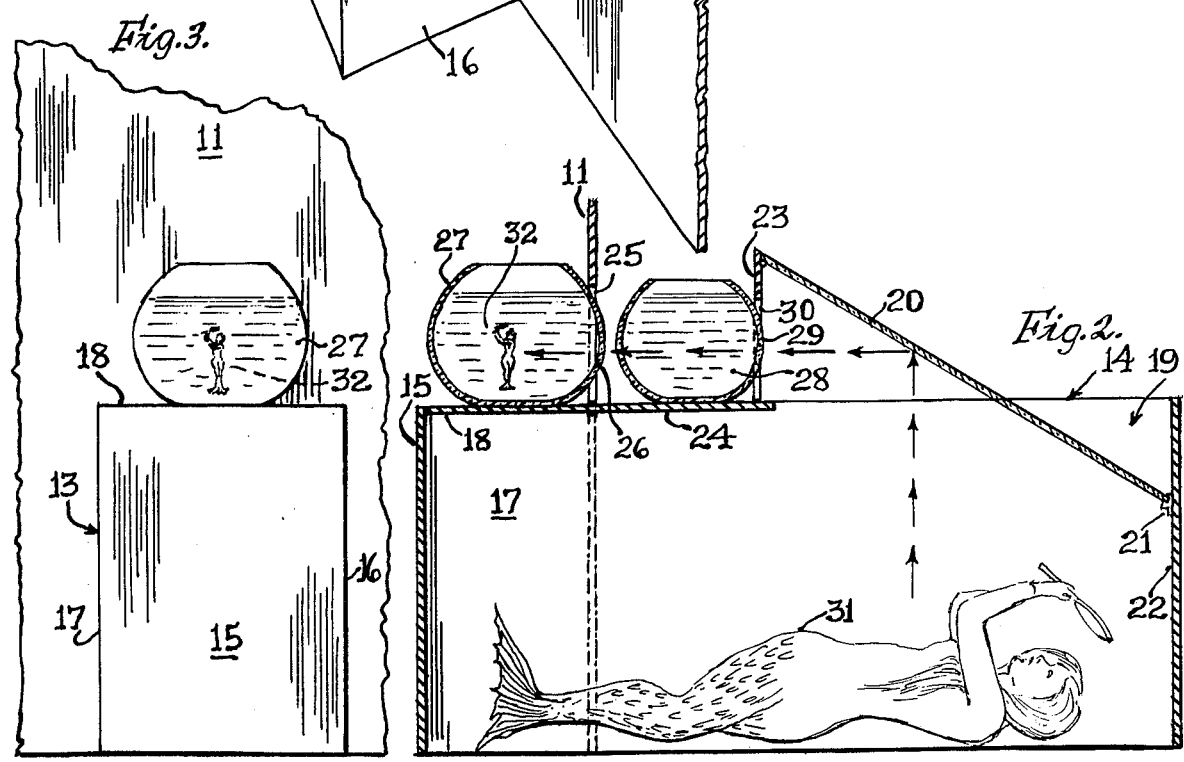
Fig.3.
Fig.2.

ILLUSION APPARATUS

SUMMARY OF THE INVENTION

An optical illusion whereby an object appears to be submerged in a liquid-filled container, such as a fish bowl. The apparatus for creating the desired optical illusion consists of a closed chamber, a portion of which forms a closed stand upon which rests the liquid-filled container or fish bowl.

A vertical wall forms the background for the stand and has formed therein an opening partially closed by the liquid container. Situated on the top wall of the container rearwardly of the vertical wall and in horizontal alignment with the opening formed therein, is a second liquid-filled container which cooperates with the viewed or first-mentioned liquid container for transmitting therethrough an image of a person or object. The chamber is of a size to receive a person or object, such that the image thereof is reflected upon an angularly disposed mirror, which in turn will reflect the image through the aligned liquid-filled containers for achieving the optical illusion.

GENERAL DESCRIPTION

The invention will be best understood by reference to the accompanying drawings which disclose the preferred form of embodiment of the invention by which the objects are achieved, and in which:

FIG. 1 is a fragmentary perspective view of the illusion apparatus showing in dotted lines the object as well as its image, which is the subject matter of the illusion;

FIG. 2 is a fragmentary detailed side elevational view of the apparatus;

FIG. 3 is a fragmentary front elevational view of the exposed portion of the apparatus, showing the appearance of the desired illusion.

Referring to the drawings, the illusion apparatus 10 is adapted to be associated with an opaque wall 11, which may be a solid structure or a screen or curtain, depending on choice or the location of the apparatus.

The wall 11 has formed therein a rectangular opening 12 through which projects one end 13 of a compartment 14. The end 13 of the compartment 14 which is exposed through the opening 12 formed in the wall 11, consists of a front wall 15, opposite side walls 16 and 17, and a top wall 18.

The compartment 14 comprises an elongated rectangularly shaped boxlike structure which has a partially open top wall portion 19 normally closed by a mirror 20. As shown in FIGS. 1 and 2, the mirror 20 is placed angularly with respect to the compartment 14 so that a portion of the mirror 20 rests upon a supporting flange 21 carried by the rearward wall 22 of the compartment 14. The opposite end of the mirror 20 rests upon the top edge of a vertical wall 23 which extends in a spaced parallel direction with respect to the wall 11.

The wall 23 is situated upon a shelflike extension 24 of the top wall 18 of the compartment, which extends through the opening 12 formed in the wall 11.

The interior of the compartment 14 may be suitably illuminated in any desired manner such that the object placed therein will be reflected upon the mirror 20, with the mirror 20 then reflecting the image in a line parallel to the plane of the object within the compartment 14.

The front wall 11 is provided with a circular opening 25 which extends upwardly from the top wall 18 of the exposed end 13 of the compartment 14, as shown in FIGS. 1 and 2. The opening 25 is of a size and shape so as to receive a portion, such as the wall 26, of a liquid-filled container 27, which is placed upon the top wall 18. The container 27 is formed from transparent material.

Upon the top shelf 24 of the top wall 18 and rearwardly of the wall 11 is a second liquid-filled container 28, likewise formed from transparent material, and which has its wall surface 29 positioned in an opening 30 formed in the vertical wall 23. By this arrangement, the image (which in the illustrations is shown to comprise a mermaid 31) is reflected onto the angularly disposed mirror 20, from which the image is reflected through the opening 30 into the liquid container 28, through the opening 25 and into the liquid container 27, the latter being exposed in a viewing position to one side of the front wall 11. The liquid contained within the containers 27 and 28 is clear, such as water, mineral oil or the like.

The optical illusion thus created through the arrangement of components hereinbefore described, creates the image of the mermaid within the liquid container 27 which, as illustrated, is in the form of a fish bowl. Any movement of the mermaid 21 is reflected into the fish bowl 27, where it is exposed to view.

The size of the image 32 as it appears in the container 27, is determined by the distance of the reflective surface of the mirror 20 to the receptacle 27 and thus may be varied according to distance, as chosen by the operator.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having thus described my invention, what I claim as new and desire to protect by Letters Patent is:

1. A fish bowl optical illusion apparatus wherein an image is made to appear in a liquid-filled container, wherein the improvement comprises
    (a) a compartment having front, back and side walls and a partial top wall providing a partially open top for the compartment,
    (b) an opaque wall member providing an opening of a size equal to the height and width of the compartment so as to receive a portion of the compartment therethrough,
    (c) an opaque stand provided by a part of said partial top wall of said compartment projecting through said opening formed in said opaque wall member,
    (d) a reflective surface angularly positioned over said partially open top of said compartment on one side of said wall member and adapted to reflect an image of the contents within said compartment below said reflective surface in the direction of said wall member,
    (e) a pair of circular liquid-filled transparent receptacles supported in horizontal alignment on said stand to either side of said opaque wall member in the path of reflection of said reflective surface, and
    (f) a second opening in said wall member in the line of the reflected image from said reflective surface and adapted to substantially receive a portion of one of said liquid-filled receptacle positioned upon said stand on the other side of said wall member and in which appears the reflected image of the contents of said compartment.

* * * * *